United States Patent [19]

Edwards

[11] Patent Number: 5,676,461
[45] Date of Patent: Oct. 14, 1997

[54] OIL INJECTION APPARATUS AND METHOD FOR POLYMER PROCESSING

[75] Inventor: Daniel C. Edwards, Burton, Ohio

[73] Assignee: M. A. Hanna Rubber Compounding a division of M. A. Hanna Company

[21] Appl. No.: 617,361

[22] Filed: Mar. 18, 1996

[51] Int. Cl.⁶ ............................. B01F 15/02; B01F 15/04
[52] U.S. Cl. ......................... 366/152.2; 366/182.2; 366/182.4; 366/76.1
[58] Field of Search ............................. 366/142, 151.1, 366/152.1, 152.2, 152.3, 152.4, 152.5, 160.1, 160.2, 160.3, 162.1, 162.2, 165.5, 182.1, 182.2, 182.3, 182.4, 348, 76.1; 137/9, 98, 101.91

[56] References Cited

U.S. PATENT DOCUMENTS

| | | |
|---|---|---|
| 3,210,163 | 10/1965 | Mommaerts . |
| 3,215,407 | 11/1965 | Dye . |
| 3,216,434 | 11/1965 | Lovendahl ............................. 137/9 |
| 4,034,847 | 7/1977 | Takagi . |
| 4,090,695 | 5/1978 | Stone . |
| 4,199,547 | 4/1980 | Levinsky . |
| 4,234,007 | 11/1980 | Titone et al. ....................... 137/101.19 |
| 4,314,963 | 2/1982 | Boden . |
| 4,399,105 | 8/1983 | Tilgner et al. ...................... 366/152.1 |
| 4,433,701 | 2/1984 | Cox et al. ........................... 366/152.2 |
| 4,533,254 | 8/1985 | Cook et al. ......................... 366/142 |
| 4,572,819 | 2/1986 | Priddy . |
| 4,614,438 | 9/1986 | Kobayashi ......................... 366/152.1 |
| 4,621,927 | 11/1986 | Hiroi ................................. 366/152.1 |
| 4,765,745 | 8/1988 | Strecker . |
| 4,778,658 | 10/1988 | Nielsen . |
| 4,886,369 | 12/1989 | Hankison ........................... 366/165.5 |
| 5,332,311 | 7/1994 | Volk, Jr. et al. ................... 366/152.2 |
| 5,340,210 | 8/1994 | Patel et al. ........................ 366/152.1 |
| 5,350,234 | 9/1994 | Hagen . |
| 5,423,607 | 6/1995 | Jones et al. ....................... 366/152.2 |
| 5,451,376 | 9/1995 | Proksa . |
| 5,452,954 | 9/1995 | Handke et al. .................... 366/152.5 |
| 5,453,250 | 9/1995 | Kreuer . |
| 5,482,368 | 1/1996 | Nakamura et al. ................ 366/152.2 |
| 5,507,307 | 4/1996 | Montegari et al. ................ 137/9 |

FOREIGN PATENT DOCUMENTS

| | | |
|---|---|---|
| 332982 | 9/1989 | European Pat. Off. . |
| JO 2078-505 | 3/1990 | Japan . |
| WO 92/13694 | 8/1992 | WIPO . |

OTHER PUBLICATIONS

"Liquid Flowmeters", pp. Z–8–Z–15, based on the article Reference File: Liquid Flowmeters in Plant Engineering Magazine, Nov. 21, 1984.

Krohne Corimass MFM 4085 K, G–Series, Technical Data Sheet.

Primary Examiner—Tony G. Soohoo
Attorney, Agent, or Firm—Jones, Day, Reavis & Pogue

[57] ABSTRACT

A method and apparatus are provided for adding controlled and accurate quantities of differing oils, to a polymer processing mixer without substantially contaminating one oil with another. Oils are contained in a plurality of oil supply tanks wherein each tank is fluidly connected to the mixer by an oil supply conduit. The speed of the oil pumped through the conduit is controlled by a variable speed pump motor drive unit. The quantity of oil passing through the conduit is preferably measured by a mass flowmeter and the measurement transmitted to a controller. A multi-directional valve controls the delivery of each oil into the mixer. The controller controls the delivery of oil into the mixer in response to the transmitted measurement, by varying the speed of the pump and opening and closing the valve.

5 Claims, 3 Drawing Sheets

OIL INJECTION APPARATUS AND METHOD FOR POLYMER PROCESSING

BACKGROUND OF THE INVENTION

When processing elastomers and other polymers, a number of components are normally mixed with the polymer to alter its properties and/or to enhance processability. In the rubber processing industry, formulations of additives for compounding of the elastomer into practical rubber products frequently include a reinforcing filler, such as carbon black; sulfur, usually in combination with an accelerator, and/or an activator; pigments; odorants; antiozonants and/or antioxidants; and a number of plasticizers and/or extenders, usually oils, such as paraffin waxes, mineral, and other oils. Varying the mix of compounding ingredients can produce a wide variety of practical elastomeric products, each customized to the customers' needs. Thus, virtually thousands of different recipes for compounding mixtures exist for producing thousands of different elastomeric products.

A persistent problem in the compounding of elastomers has been control of the addition of oils, such as staining, non-staining and ester class oils, to the polymer in a processing mixer. For example, in a single batch, many different oils of differing classes, weights and viscosities may be added, in varying amounts, to a single compounding mixture. The properties of the finished material depend on the combination and quantity of the oils employed. Therefore, to assure uniformity of the product from batch to batch, the quantities of the added oils must be carefully controlled. Moreover, oils of differing viscosity may preferably require differing rates of injection into the compounding mixture to increase the efficiency of the mixing process.

In current manufacturing practice, each oil is separately added to the compounding mixture by pumping the oil from a bulk oil storage tank or an oil drum into a weigh tank, where the oil is weighed prior to being discharged into a surge tank. From the surge tank, the oil is pumped to an injector for injection into the rubber processing mixer where it is combined with the elastomeric mixture. This "vat" system has several disadvantages, especially when several different oils are being added to an elastomer during compounding. Oil has a tendency to coat and stick to the sides of the vats and associated piping. Thus, when changing from one oil additive to another, a time-consuming and, therefore, expensive purge of the oil transfer system, including the weigh tank, surge tank and associated piping, must be undertaken in order to remove the oil that was added previously. Air must then be removed from the oil lines by priming with the new oil, another time-consuming step. Frequently, the previously added oil is not fully purged from the system, resulting in contamination of the new oil by the old oil, and alteration of the desired properties and quality of the end product.

Another disadvantage of the vat system is that there is no mechanism for measuring the temperature and viscosity of the oils entering the weigh tank, properties on which accurate calculation of the weight per volume of oil depend. Therefore, the quantity of each oil injected into the mixer may not be consistent from batch to batch, again resulting in alteration of the properties and quality of the end product. A further disadvantage of the vat system is that it does not provide a means of controlling and varying the speed of injection of the oil into the polymer mixture, thus reducing the efficiency of the mixing process. The vat system also requires high maintenance of valves and associated piping, etc.

A need exists, therefore, for an efficient system for adding a plurality of different oils to polymers, including elastomers, to produce end products having uniform properties and quality, from batch to batch. Further, a need exists for a system of adding a plurality of oils to a processing mixer, wherein the oils may be added individually, without contamination of one oil with another and without the necessity of purging of the oil transfer system between differing oil additions. Further, a need exists for a system of adding an accurate quantity of each oil to the compounding mixture, to provide an end product having consistent properties and quality from batch to batch. Further, a need exists for a system capable of variable speed injecting of the oil to increase the efficiency of the compounding process.

SUMMARY OF THE INVENTION

The present invention is a method and apparatus for adding controlled and accurate quantities of differing classes, weights and viscosities of oils, to a processing mixer, without substantially contaminating one oil with another. The invention is especially useful for adding differing oils to polymers, especially elastomers, in a mixing tank, to produce rubber and other compounded end products having uniform properties and quality from batch to batch. The invention differs from prior systems for adding oil to elastomers in that it does not employ either a weigh tank or a surge tank. Further, the invention eliminates both the need for purging the oil transfer system between differing oil additives within and between batches and the possibility of undesirable contamination of one oil with another. The invention also eliminates the need to purge the oil transfer system between multiple runs when standard bulk oils are employed, and between batches employing less frequently used oils, usually contained in drums.

According to the present invention, each of a plurality of oil supply tanks or oil drums is in fluid communication with a single polymer processing mixer by means of a plurality of oil supply conduits, each conduit fluidly connecting the supply tank or drum to the mixer. As used to describe the invention, "fluidly connecting" or "fluidly connected" are defined as connected by any connection means that allows for the flow of a substance, such as oil, from one component of the apparatus to another. Classes of oils which may be utilized in the invention include, but are not limited to, staining, non-staining and ester class oils.

Oil from each of the supply tanks is pumped through its conduit to the processing mixer by means of a plurality of pumps, each governed by a variable speed drive unit and each fluidly connected to one of the conduits. A multi-directional valve is in fluid communication with one or more of the conduits and with the mixer to allow each oil to flow separately into the mixer. Preferably, an oil injector is also in fluid communication with the mixer and one or more of the conduits to facilitate delivery of the oil into the mixer.

By the invention, as an oil is pumped through the conduit from an oil supply tank to the mixer, the quantity of the oil passing through the conduit is measured by a measuring device, preferably a mass flowmeter. The oil quantity measurement is continuously transmitted to a controller that controls the amount of oil entering the mixer in response to the transmitted measurement. The controller is preferably programmed to store a desired predetermined reference oil quantity measurement and to receive the transmitted measurement. The controller is further preferably programmed to compare the received measurement with the reference measurement, to slow the flow of oil when the received measurement nears the reference measurement, and to stop the flow of oil into the processing mixer when the received measurement is substantially equal to the reference measurement. The controller is in electronic communication with the measuring device, the valve, and the variable speed drive unit which controls the speed of the pump motor. The controller controls the flow of each oil into the processing tank by controlling the pumping speed and the opening and closing of the valve, in response to the transmitted signal from the measuring device.

DETAILED DESCRIPTION OF THE INVENTION

The invention is a method and apparatus for delivering a plurality of oils of differing classes, weights and viscosities to a polymer processing mixer, in a batch process, without substantially contaminating one oil with another. The invention eliminates the need to purge the oil transfer system between oils within and between batches when frequently used standard bulk oils are employed, and eliminates the need to purge the system between batches employing less frequently used drum oils.

The invention allows efficient and accurate control of the quantity of the oil injected into the mixer, by preferably employing a mass flowmeter to directly measure the mass rate of flow of the oil to the mixer, thus eliminating the inaccuracies associated with pre-weighing the oil in a weigh tank. Further, the invention provides for control of the speed of injection of the oil into the mixer by employing a variable speed drive unit to control the speed of an oil pump motor. Thus, the rate of oil injection may be slowed as the amount of oil injected approaches a predetermined desired quantity, to further control the accuracy of the delivered quantity of oil. Variable control of the pump speed also allows desirable variation in the rate of injection of a given oil into the compounding mixture and thus increases the efficiency of the compounding system.

Figure 1:
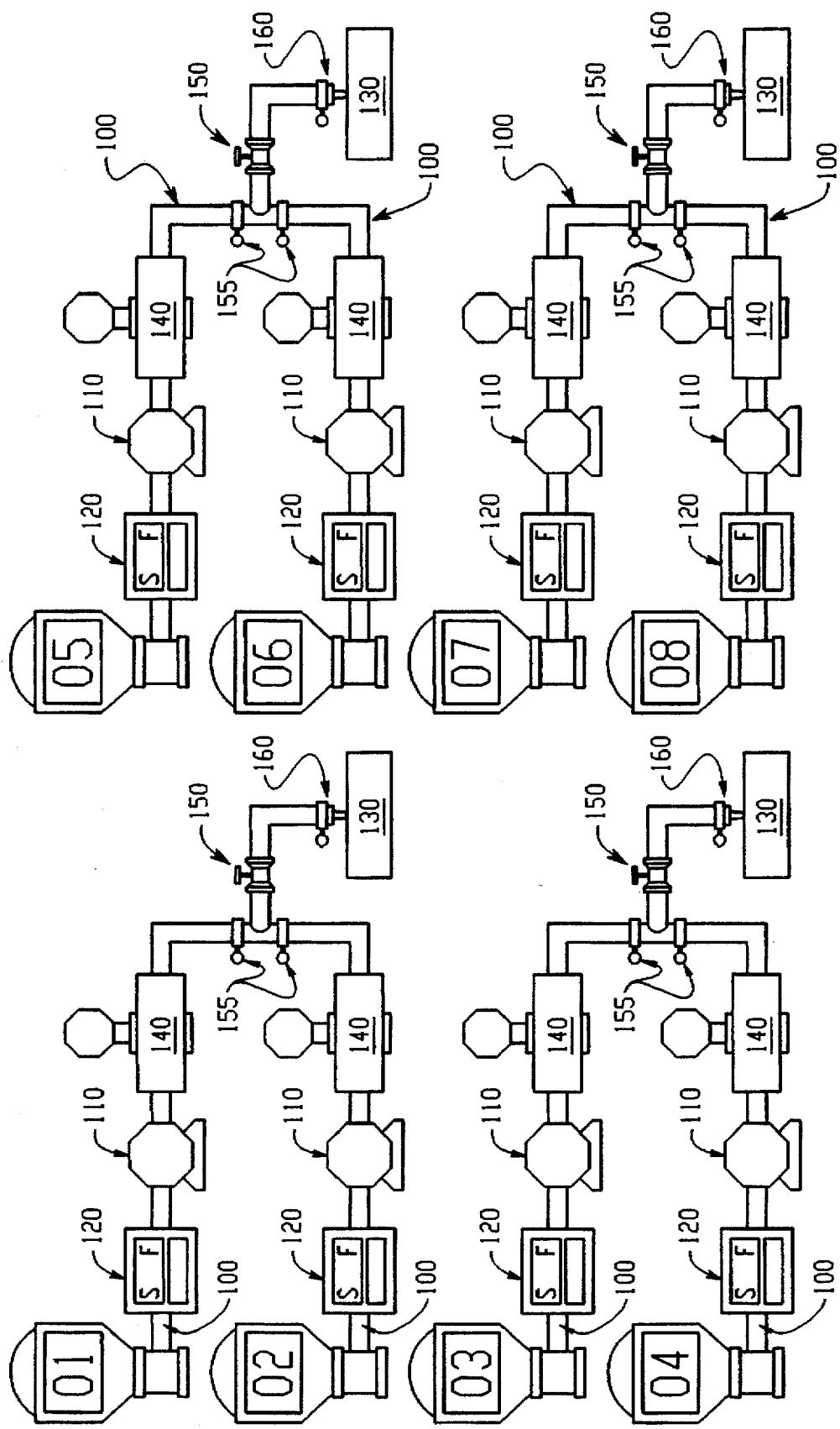
FIG. 1 is a schematic illustration of an embodiment of the apparatus of the invention for injecting a plurality of oils into a mixer.
Figure 2:
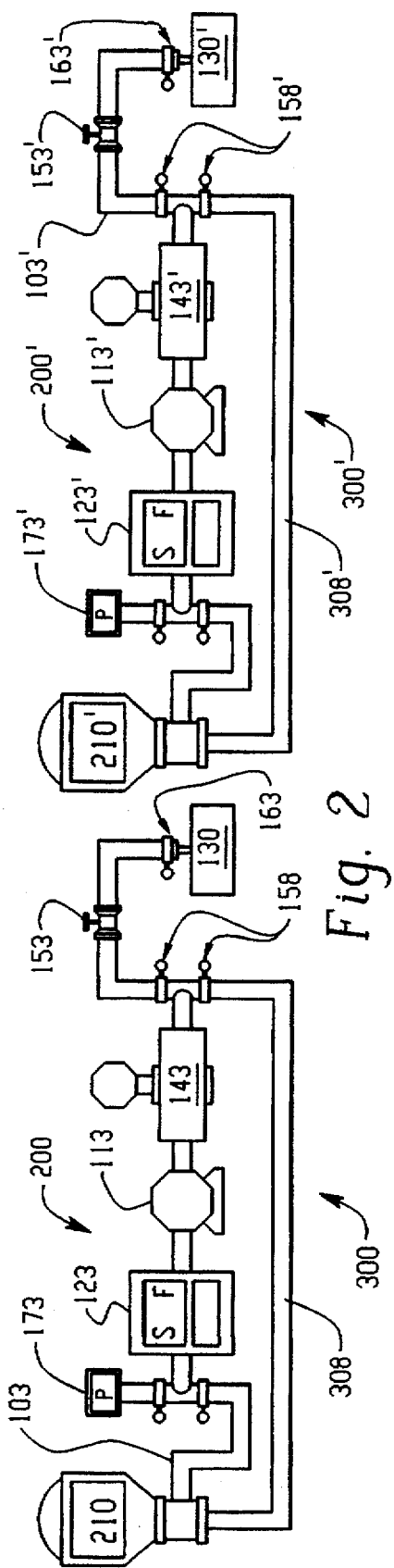
FIG. 2 is a schematic illustration of an embodiment of the apparatus of the invention for injecting a single oil into a mixer.
Figure 3:
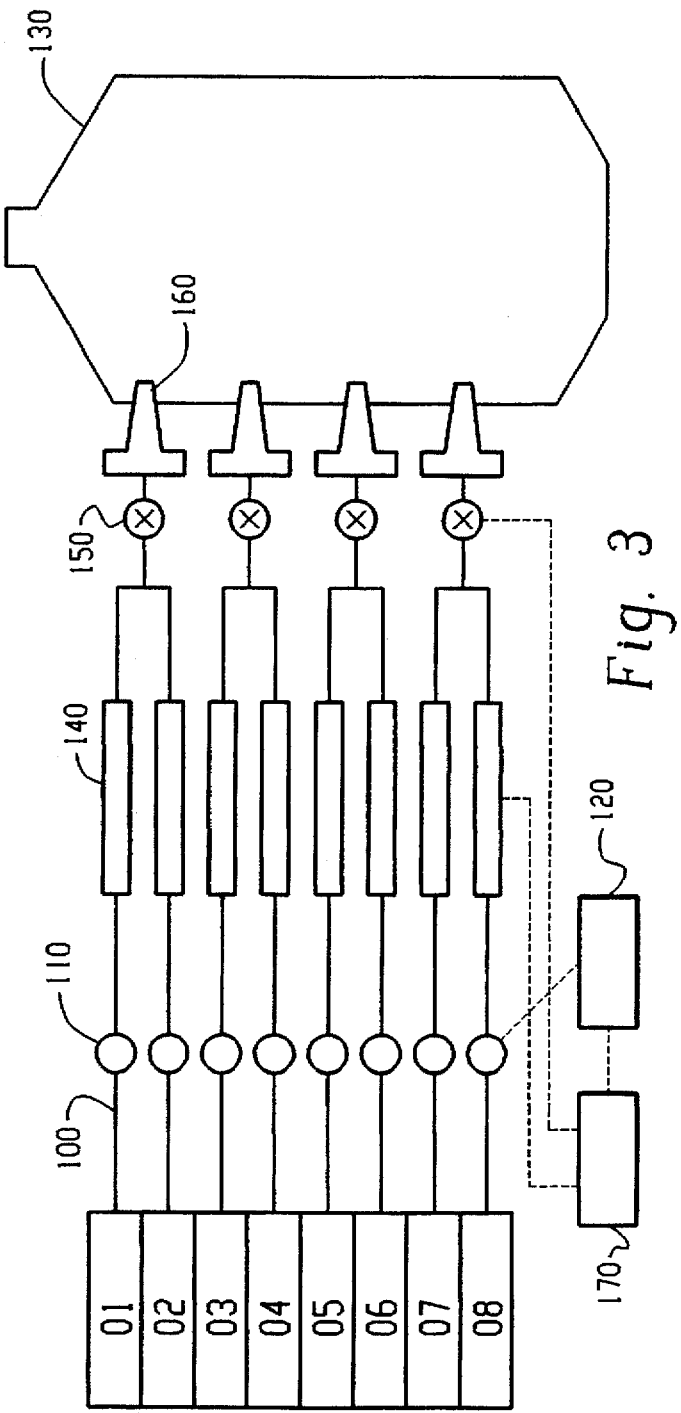
FIG. 3 is a schematic illustration of the control system of the invention.

Schematic illustrations of embodiments of the apparatus of the invention are shown in FIGS. 1, 2 and 3. According to the invention, a plurality of oil supply tanks (01–08) contain oils to be delivered to a single processing mixer (130) during compounding. The oil supply tanks (01–08) are in fluid communication with the processing mixer (130) by means of a plurality of oil supply conduits (100), each conduit being dedicated to one of the oil supply tanks (01–08) and being fluidly connected to the processing mixer (130). Each of a plurality of pumps (110) is fluidly connected to one of the oil supply conduits (100) to pump oil from each of the supply tanks (01–08) to the mixer (130). Preferably, each of the pumps (110) is operated by an alternating-current motor controlled by a variable speed drive unit (120), as described further herein below with regard to FIG. 4.

An important feature of the invention illustrated in FIGS. 1, 2 and 3 is a plurality of measuring devices (140), wherein each device (140) is in fluid communication with one of the conduits (100) for accurately measuring the quantity of oil passing through the conduit (100). Based on this measurement, the quantity of a given oil from one of the oil supply tanks (01–08) delivered to the mixer (130) can be accurately controlled, as described below. Preferably, the measuring devices (140) are mass flowmeters and, more preferably, are Coriolis-type mass flowmeters, which are known by those skilled in the art. A suitable Coriolis meter is a Krohne CORIMASS MFM 4085K G-Series mass flowmeter, available from H. R. Bowers Company, Cleveland, Ohio. It is envisioned that other measuring devices for the oils may be used in the invention. For example, devices which incorporate the capability of measuring temperature, pressure, mass, viscosity, specific gravity, or flow rate of the oil, and combinations thereof, may transmit these values to a processor/controller, such as processor/controller (170), and the weight per volume of oil calculated.

According to the invention, delivery of the oil from each of the conduits (100) is preferably governed by a multidirectional valve (150) and, optionally, other valves (155) positioned in fluid communication with conduits (100) and the processing mixer (130). The valves (150, 155) have at least one open position whereby oil from a conduit (100) can flow into the mixer (130) and at least one closed position whereby that oil cannot flow into the mixer. Valve (150) has the capability of controlling the flow of oil from one or a plurality of conduits (100) into the mixer (130). Valve (150) may be a five-way or greater valve, but preferably is a three-way valve. As used herein, the term "three-way valve" means that the valve has three orifices. One orifice connects to one of the conduits (100), a second orifice connects to another of the conduits (100) and a third orifice connects to, or is in fluid communication with, the mixer (130). Preferably, the valve (150) automatically moves to a closed position and prevents any oil from entering the mixer in the event of an interruption in power supply.

When a rubber processing mixer (130) having thick sidewalls, such as a Banbury mixer, is employed, an oil injector (160) mounted to the mixer (130) and in fluid communication with the valve (150) and the mixer (130), is preferably employed. Oil from at least one of the conduits (100) is injected through injector (160) into the mixer (130). Thus, a single injector (160) and a single valve (150) may be in fluid communication with more than one oil supply conduit (100). Further, more than one injector (160) and/or valve (150) may be in communication with the mixer (130), thus allowing a plurality of different oils to be injected separately into a single mixer (130). For example, as illustrated in FIGS. 1 and 3, if eight different oils (01–08) are used as a standard stock of oils frequently used in compounding recipes, each oil is stored in a separate tank and transferred from the tank to the mixer via one of the conduits (100). Preferably, two of the conduits are connected to one three-way valve (150), which is connected to one injector (160), and four of these valve/injector combinations are fluidly connected to the mixer (130) to accommodate delivery of eight different oils.

According to the embodiment of the invention illustrated in FIGS. 1 and 3, a valve (150) and/or optional valves (155) control the flow of oil from each of the oil supply conduits (100). Thus, each standard stock oil conduit (100) remains completely filled with oil, even when the valves (150, 155) are in the closed position. Because each of the oil supply conduits (100) is dedicated to only one stock oil, the necessity for purging between the addition of differing oils is completely eliminated. Although there is potential for an insignificant degree of contamination between differing oils in a minimal length of piping that may be provided downstream from valve (150) or optional valves (155), this minimal contamination is easily accounted for in the recipe for compounding the polymer, and is consistent from batch to batch.

According to the embodiments of FIGS. 1 and 3 and described in further detail herein below with regard to FIG. 4, a controller (170) is in electronic communication with the measuring device (140) and with the valves (150, 155) and the variable speed drive unit (120) associated with the pump connected to one of the conduits (100). Preferably, the controller (170) accurately controls the delivery of each oil to the mixer. Alternatively, one controller (170) may control the delivery of a plurality of oils. The delivery of each oil may also, optionally, be manually controlled.

FIG. 2 illustrates an embodiment of the invention which may be employed when less frequently used oils, usually contained in oil drums (210, 210'), are added to the mixer. In this embodiment, one branch (200, 200') of the system fluidly connecting the oil drums (210, 210') with the mixer (130) comprises an oil supply conduit (103, 103'), pump (113, 113'), variable speed drive (123, 123'), measuring device (143,143'), valve system (153, 153' and 158, 158') and injector (163, 163'), all similar to that illustrated in FIGS. 1 and 3. However, the branch (200, 200') additionally comprises an oil purge line (173, 173'), which preferably supplies compressed air in order to purge the conduit and associated pumps, piping and instrumentation when a desired number of batches comprising a customized run is completed. Thus, the oil delivery system of the invention has an advantage over prior systems in that the oil conduit may remain filled with drum oil during an entire run and does not have to be purged between batches employing that oil. Another branch (300, 300') of the system comprises a conduit (308, 308') fluidly connecting the oil drum (210, 210') directly with the valves (153, 153' and 158, 158'), the injector (163, 163') and the mixer 130, bypassing the pump (113, 113'), variable speed drive control (123, 123') and quantity measuring device (143, 143'). Such a conduit (308, 308') is used in the invention for delivering the entire known quantity of oil contained in the oil drum, without the necessity of measuring the quantity or controlling the rate of flow of the oil.

Figure 4:
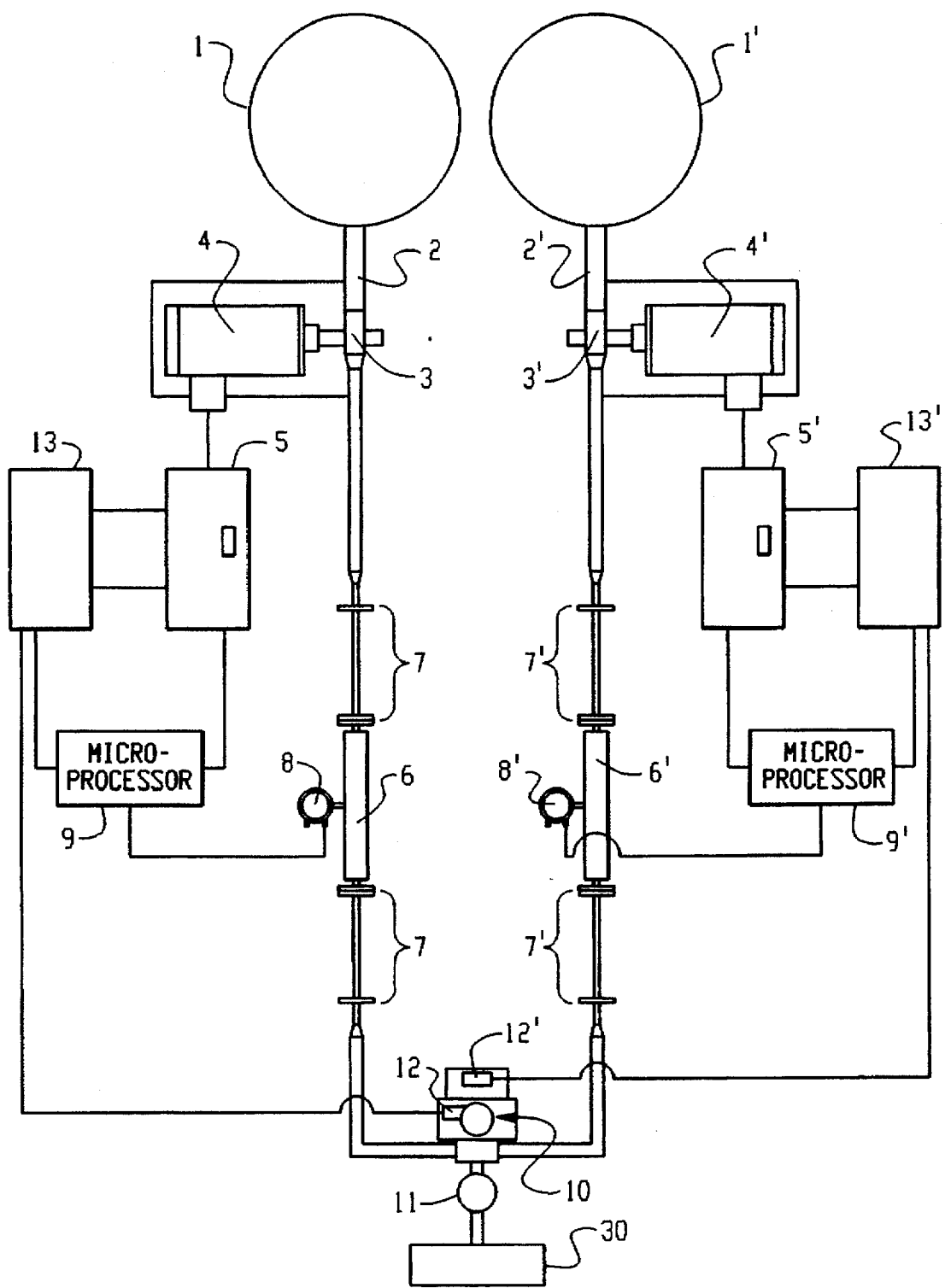
FIG. 4 is a schematic illustration of a preferred embodiment of the invention for injecting two differing oils into a mixer.

A preferred embodiment of the invention is illustrated in FIG. 4. In this embodiment, oil is contained in an oil reservoir or oil supply tank, which may be a bulk oil storage tank, an oil drum, or a reservoir fluidly connected to a bulk oil storage tank. In the illustrated embodiment, each of two oil reservoirs (1, 1') are in fluid communication with a polymer processing mixer (30) by means of oil supply conduits (2, 2'). Positive displacement suction pumps (3, 3'), powered by alternating-current motors (4, 4') pump the oils from the oil reservoirs (1, 1') through the oil supply conduits (2, 2') to the mixer (30). Variable speed drive units (5, 5') electrically connected to power supplies (13, 13') are employed to control the speed of the pump motors (4, 4') by known methods, thus controlling the speed of delivery of the oil from the oil reservoirs (1, 1') to the mixer (30). Preferably, the power supply (13, 13') is a combination of a starter for the drive unit (5, 5') and an over current protection for the pump motor (4, 4').

In the embodiment illustrated in FIG. 4, the quantity of oil passing through the oil supply conduits (2, 2') is measured by Coriolis-type mass flowmeters (6, 6'). A suitable Coriolis meter is a Krohne CORIMASS MFM 4085K G-Series mass flowmeter, available from H. R. Bowers Company, Cleveland, Ohio. Coriolis meters operate by well-known principles and are true mass meters that directly measure the mass rate of the oil flow, as opposed to volumetric flow. Because mass does not change, the meter reading is linear without having to be adjusted for variations in the oil properties. It also eliminates the need to compensate for changing temperature and pressure conditions. The meter is especially useful for measuring oil because the viscosity of the oil may vary with flow velocity at given temperatures and pressures. Thus, the mass flowmeter is preferred in the system of the invention, because the measurement is highly accurate and does not depend on the specific gravity (viscosity), flow rate, temperature or volume of the oil, and/or pressure conditions. The successful use of a mass flowmeter in the batch system of the invention is surprising, since mass flowmeters have been previously known for use only in continuous flow systems, such as milk processing. In particular, the batch system of the present invention requires the starting and stopping of the flow of the individual oil through the mass flowmeter, according to the demand for that oil. The mass flowmeters (6, 6') are connected in the oil supply conduits (2, 2'), to be in fluid communication with the oil flow, by associated connections and lengths of piping (7, 7') as known in the art. However, as described herein above, the measuring devices may be any measuring device which can provide a measurement of volume, weight, mass, flow rate, temperature, or viscosity of the oil, and combinations thereof, and transmit the data to a controller for calculation of the oil quantity.

Downstream from the mass flowmeter, the oil supply conduits (2, 2') are preferably fluidly connected through a single multi-directional valve (10) to an oil injector (11) or other oil delivery means fluidly connected to the mixer (30) for delivering the oil from the oil supply conduits (2, 2') directly into the mixer (30). When two oil supply conduits (2, 2') are connected to a single valve (10), as in the illustrated embodiment, the valve (10) is preferably a three-way valve. However, it is envisioned that more than two oil supply conduits may be connected to a single valve. Thus, the valve (10) may be a five-way valve for connecting to four conduits and the mixer, or even a seven-way valve for connecting to six conduits and the mixer. A separate valve gate controls the flow of oil from each conduit connected to the valve. For each of the oil supply conduits connected to the valve (10), the opening and closing of the gate is governed by an actuator (12, 12') (as described below) to allow the individual flow of oil from the individual oil supply conduits into the mixer (30). Preferably, the valve automatically moves to a closed position and prevents any oil from entering the mixer in the event of an interruption in power supply.

According to the embodiment illustrated in FIG. 4, a sensing element within each of the mass flowmeters (6, 6') transmits data to an electronic unit (8, 8'), where the data is processed and converted to a voltage proportional to the mass flow rate of the oil in the respective conduit (2, 2'). Each voltage reading is then transmitted to a batch controller unit or microprocessor (9, 9') which is in electric or electronic communication with a valve actuator (12, 12'), the respective variable speed drive unit (5, 5') and the respective power supply (13, 13'). Alternatively, a single controller unit may be in communication with a plurality of valve actuators, variable speed drive units and power supplies.

The controller or plurality of controllers (9, 9') thus control the flow of oil from each conduit (2, 2') into the mixer (30) by controlling the speed of the respective pump motor (4, 4') and by opening and closing the valve (10) in response to a signal from the respective measuring device (6, 6').

According to the method of the invention, as an oil is pumped through a conduit (2, 2') from an oil supply tank (1, 1') to the mixer (30), the amount of oil passing through the conduit is measured by the quantity measuring device (6, 6'), preferably a mass flowmeter. The oil quantity measurement is continuously transmitted to the controller (9, 9') that controls the amount of oil entering the mixer (30) in response to the transmitted measurement. The controller (9, 9') is preferably programmed to store a desired predetermined reference oil quantity measurement and to receive the transmitted measurement. The controller (9, 9') is further preferably programmed to compare the received measurement with the reference measurement, to slow the flow of oil when the received measurement nears the reference measurement, and to stop the flow of oil into the processing mixer when the received measurement is substantially equal to the reference measurement.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

I claim:

1. An apparatus for adding a plurality of individual oils to a polymer during a batch compounding process, comprising:
   a mixer containing a polymer;
   a plurality of oil supply tanks, wherein each tank contains an individual oil;
   a plurality of oil supply conduits, wherein each individual conduit fluidly connects an individual oil supply tank to the mixer;
   a controller;
   a plurality of variable speed pumps in electronic communication with the controller, wherein each individual pump is fluidly connected to an individual oil supply conduit, and wherein each pump comprises a pump motor and a variable speed drive unit for controlling the rate of flow of an individual oil through its individual conduit to the mixer in response to a signal from the controller;
   a plurality of valves in electronic communication with the controller, wherein each individual valve is fluidly connected to one or more of the individual oil supply conduits, wherein the valve has at least one open position to allow the flow of an individual oil through its respective conduit into the mixer and a closed position to stop the flow of the individual oil through its respective conduit into the mixer, in response to a signal from the controller;
   a plurality of mass flowmeters in electronic communication with the controller, wherein each individual mass flowmeter is fluidly connected to an individual oil supply conduit, for measuring the quantity of an individual oil flowing through its respective individual conduit and transmitting the measurement to the controller,
   wherein the controller is programmed to store a predetermined reference measurement which is equivalent to the desired quantity of an individual oil to enter the mixer, and wherein the controller is further programmed to receive the transmitted measurement from the individual mass flowmeter, to compare the received measurement with the reference measurement, and to close the individual valve to stop the flow of an individual oil into the mixer when the received measurement is substantially equivalent to the reference measurement.

2. The apparatus of claim 1, wherein the controller is further programmed to signal the variable speed pump to slow the rate of flow of the individual oil into the mixer when the transmitted measurement nears the reference measurement.

3. The apparatus of claim 1, further comprising a plurality of injectors, wherein each of the injectors fluidly connects two or more of the individual oil supply conduits to the mixer, and wherein each of the individual oils is injected separately into the mixer through its connected injector.

4. A method for adding a plurality of individual oils to a polymer during a batch compounding process, comprising the steps of:
   (a) providing
      (i) a mixer containing a polymer;
      (ii) a plurality of oil supply tanks, wherein each tank contains an individual oil;
      (iii) a plurality of oil supply conduits, wherein each individual oil supply conduit fluidly connects an individual oil supply tank to the mixer;
      (iv) a controller;
      (v) a plurality of variable speed pumps, a plurality of valves, and a plurality of mass flowmeters, wherein each of the pumps, each of the valves and each of the mass flowmeters is in electronic communication with the controller, and wherein each individual oil supply conduit has an individual pump, an individual mass flowmeter and a valve fluidly connected thereto, and wherein each of the plurality of valves has at least one open position to allow the separate flow of an individual oil through its respective individual conduit into the mixer and a closed position to stop the flow of the individual oil through its respective conduit into the mixer;
   (b) allowing the flow of an individual oil through its individual conduit by opening a valve in response to a signal from the controller;
   (c) pumping the individual oil through its respective oil supply conduit into the mixer;
   (d) controlling the rate of flow of the individual oil through its respective oil supply conduit by controlling the pump speed in response to an electronic signal from the controller;
   (e) measuring the quantity of the individual oil flowing through its respective oil supply conduit with the individual mass flowmeter and transmitting the measurement to the controller;
   (f) controlling the quantity of the individual oil entering the mixer, wherein the controller is programmed to store a predetermined reference measurement which is equivalent to the desired quantity of the individual oil to enter the mixer, and wherein the controller is further programmed to receive the transmitted measurement and to compare the received measurement with the reference measurement;
   (g) stopping the flow of the individual oil through its respective conduit into the mixer when the transmitted measurement is substantially equivalent to the reference measurement by closing the valve in response to an electronic signal from the controller; and
   (h) repeating steps (b) through (g) until a desired number and quantity of individual oils of the plurality of oils have been added to the polymer in the mixer.

5. The method of claim 4, further comprising the step of slowing the rate of flow of the individual oil into the mixer when the transmitted measurement nears the reference measurement.

* * * * *